Oct. 28, 1924.
R. L. LLOYD
SINTERING MACHINE
Filed July 21, 1923
1,513,466
2 Sheets—Sheet 2
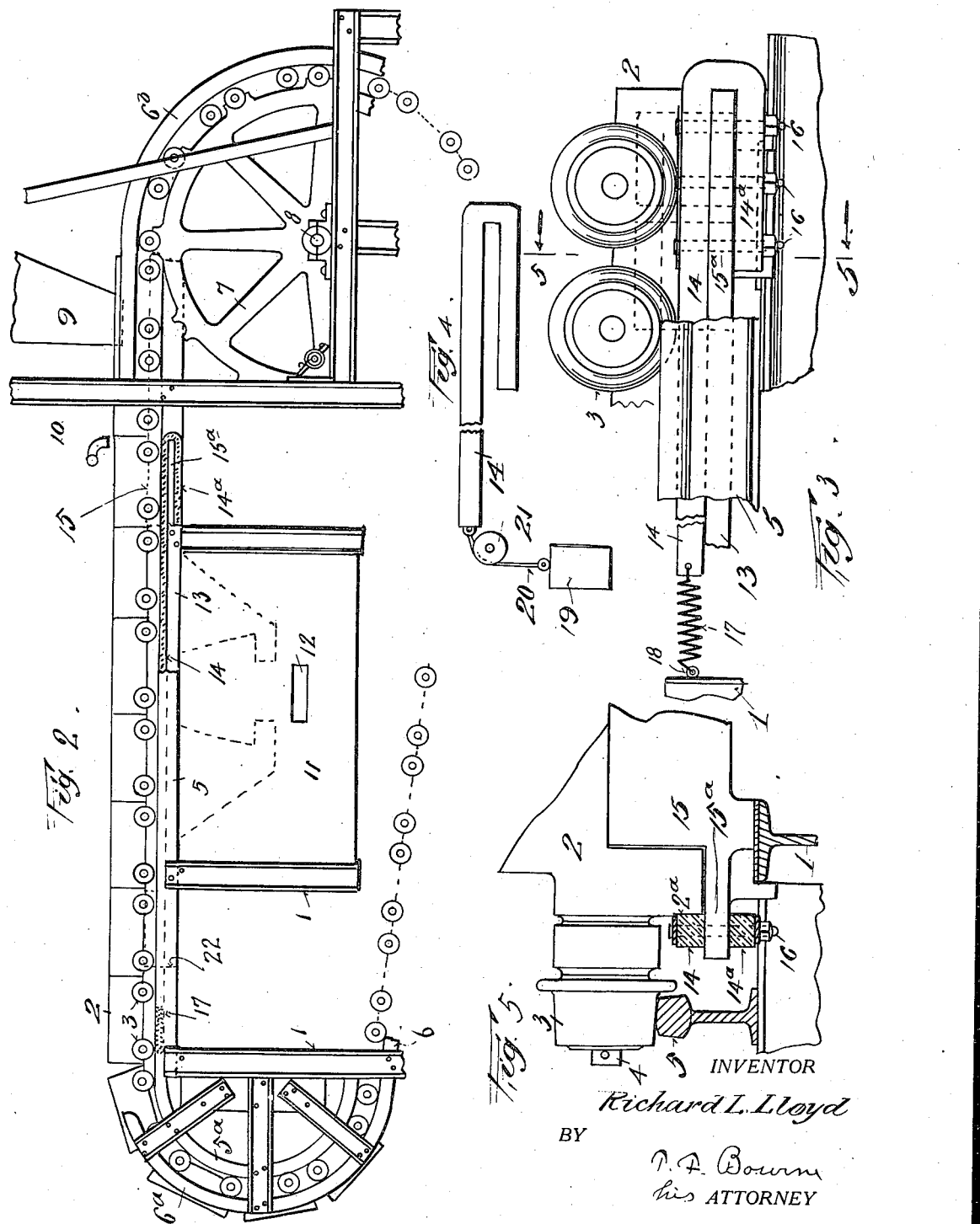
INVENTOR
Richard L. Lloyd
BY
T. F. Bourne
his ATTORNEY Patented Oct. 28, 1924.

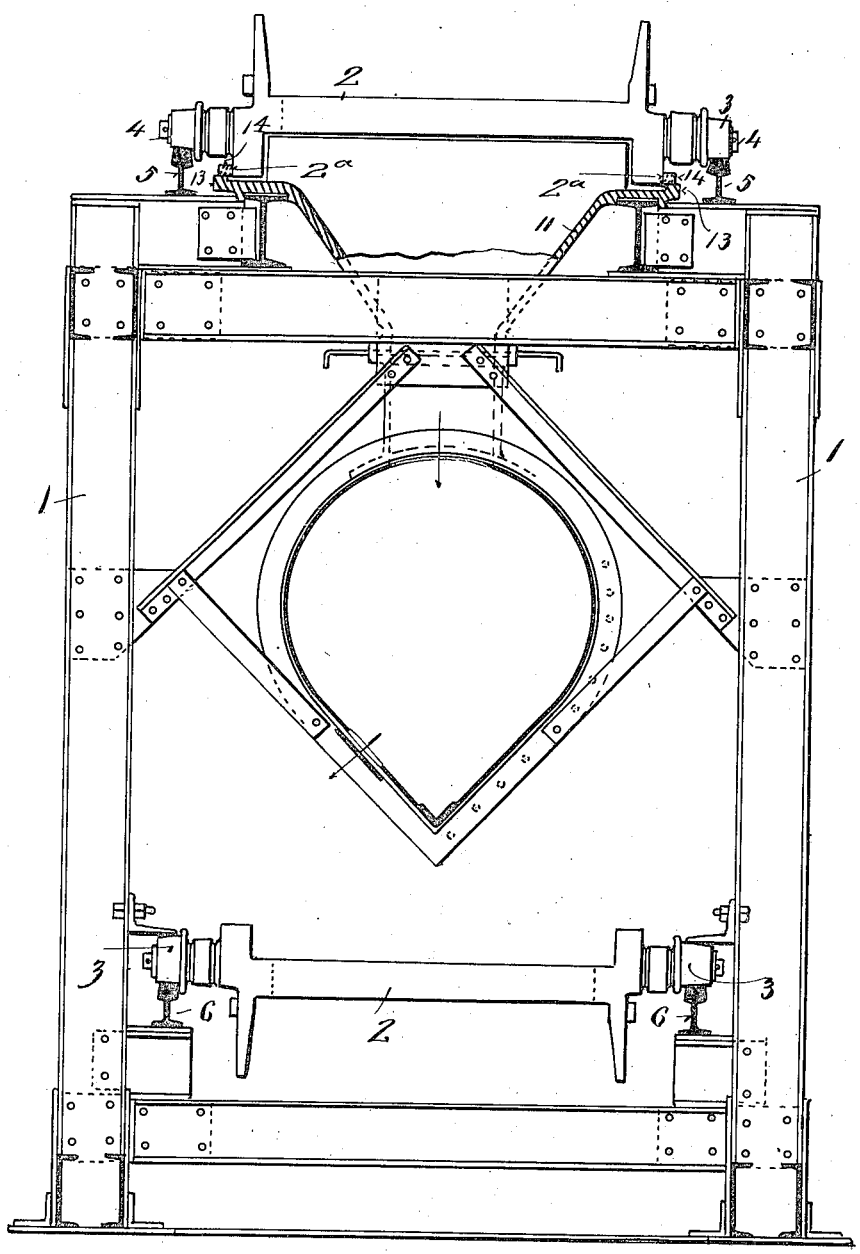

1,513,466

UNITED STATES PATENT OFFICE.

RICHARD LEWIS LLOYD, OF NEW YORK, N. Y., ASSIGNOR TO DWIGHT & LLOYD SINTERING CO., INC., OF NEW YORK, N. Y., A CORPORATION OF DELAWARE.

SINTERING MACHINE.

Application filed July 21, 1923. Serial No. 652,874.

*To all whom it may concern:*

Be it known that I, RICHARD LEWIS LLOYD, a citizen of the United States, and resident of New York city, in the county of New York and State of New York, have invented certain new and useful Improvements in Sintering Machines, of which the following is a specification.

My invention relates to improvements in machines for treating ores, and has particular reference to machines in which movable receptacles or pallets travel over an air suction box or chest, commonly called a wind box, the air being drawn or sucked through the burning ore in said receptacles into such wind box. Leakage of air has occurred at joints between the receptacles or pallets and the wind box with a consequent power and other loss in operating the machines.

The object of my invention is to provide means to make practically air tight joints between the pallets and the wind box as the pallets travel over the latter at the upper portions of the wind box, such sealing means being under the influence of air pressure due to the partial vacuum induced in the wind box which aids in causing the sealing means to bear against the pallets and supports on the wind box thus providing a tight seal, the sealing means being flexible and maintained in position to contact with the wind box and pallets during travel of the latter.

My invention also comprises novel details of improvement which will be more fully hereinafter set forth and then pointed out in the claims.

Reference is to be had to the accompanying drawings forming a part hereof, wherein:—

Fig. 1 is a vertical section of a machine embodying my invention, taken through the wind box;

Fig. 2 is a partly broken side view of the upper portion of the machine;

Fig. 3 is an enlarged detail side view of part of the machine showing means for attaching the sealing means;

Fig. 4 illustrates a modification of Fig. 3, and

Fig. 5 is a detail section on line 5, 5, in Fig. 3.

Similar numerals of reference indicate corresponding parts in the several views.

The main frame of the machine is indicated generally at 1, which may be of any suitable or usual construction, and the pallets are indicated at 2 and shown provided with flanged rollers or wheels 3 on opposite sides journaled upon hubs or shafts 4, which pallets may be of any desired or well known construction. The wheels 3 are adapted to travel upon rails or tracks 5 spaced on opposite sides of the machine. At the upper part at the delivery end of the machine the tracks are curved downwardly at $5^a$. The wheels of the receptacles or pallets 2 are adapted to travel on downwardly inclined spaced tracks 6 to spaced operating sprocket wheels 7 on shaft 8, and at the delivery end of the machine the tracks 6 are curved at $6^a$ spaced from curved track portions $5^a$ so that the wheels 3 will travel therebetween. The rear portions of tracks 6 are curved upwardly at $6^b$ outside of sprocket wheels 7. The receptacles or pallets that are delivered from the upper tracks 5 will descend between the curved portions $5^a$ and $6^a$ and travel down the inclined tracks 6 to be elevated by the sprocket wheels 7 for delivery to the tracks 5, in a well known way. The sprocket wheels are carried upon shaft 8 and may be rotated in any desired manner. The parts above described are substantially similar to United States Letters Patent Nos. 1,027,084 and 1,027,110 granted May 21, 1912. The pallets or receptacles are of such a construction as to engage end to end when pushed along the tracks 5 by the sprocket wheels. The ore or other material to be treated may be delivered into the receptacles or pallets from a hopper 9 and flame for ignition of material in the receptacles may be supplied from a gas pipe and burners in any well known manner, indicated at 10 in Fig. 2. A wind or suction box is provided at 11 into which air may be drawn or sucked in any well known manner to cause the air to pass downwardly through the ignited material in the receptacles or pallets, as by connecting a pipe at opening 12 in the wind box, which pipe may be connected in any suitable air exhaust apparatus or blower. There may be one or more wind or suction boxes supported upon the main frame in any suitable or well known manner.

The outer sides or surfaces of the receptacles or pallets 2, below the wheels 3, are made smooth at $2^a$, and adjacent thereto and outside of the receptacles at the upper open end of the wind box or boxes the latter have longitudinally and horizontally disposed spaced ledges 13 upon which loosely rest longitudinally disposed flexible sealing means 14. The sealing means 14 bear simultaneously against the outer surfaces 2ª of the receptacles or pallets and against the smooth upper surfaces of the ledges 13 of the wind box serving to resist the entrance of air into the wind box along the pallets. The sealing means being seated upon the ledges 13 rests freely and loosely thereon and is subject to be drawn against said ledges and against the sides of the traveling pallets by reason of the reduction of air pressure within the wind box or boxes. Such sealing means may be of any suitable material, and cross section, such as metal rope, preferably smooth lay wire rope, or rope comprising asbestos or other heat resisting material. The sealing means 14 may or may not be self-lubricating, or the sealing means may comprise rope or rod sheathed with soft metal or anti-friction washers of any desirable construction replaceable if required. The washers may be of any suitable construction and may have one side open to be readily applied upon or removed from the rope. The sealing means, being supported loosely upon the ledges 13, may conform to movements of the receptacles or pallets as they travel due to heat movements of the material of the wind boxes and the pallets, either vertically or laterally. The sealing means is also self-cleaning as respects dust which would be sucked into the wind box. Any suitable means may be provided for retaining the sealing means 14 in place upon the ledges 13. In Figs. 3, 4 and 5 I have shown the sealing means or rope 14 at one end secured to a lateral extension or flange 15ª extending from the dead plate 15 at the receiving end of the wind box, an end portion of the sealing means or rope being shown resting upon the flange 15ª and carried around and under the same at 14ª and secured by bolts at 16, (Fig. 3). The flange 15ª and the adjacent ledge 13 are in horizontal register so that the sealing means or rope will rest properly upon the same. The construction described is provided on opposite sides of dead plate 15. At their opposite ends the sealing means or ropes 14 may be retained in place by any suitable means. I have illustrated a spiral spring 17 secured at one end to the corresponding rope 14 and at the other end to an eye 18 secured upon a portion of frame 1. Said springs are normally under tension serving to draw the corresponding sealing means or rope 14 lengthwise to retain it upon the ledge 13 and against the sides of the pallets. Instead of using springs to stretch and retain the sealing means or ropes 14 I may provide weights 19 having flexible connections 20 passing over pulleys 21 journaled upon the main frame, said connections being attached to the sealing means or ropes 14, as indicated in Fig. 4, to maintain a strain upon the sealing means. By the means described the sealing means or ropes may be readily removed and renewed without disturbing other elements of the machine. The wearing surfaces of the sealing means or ropes also may be reversed in position respecting the side surfaces 2ª of the pallets and the supporting ledges 13. A dead plate 22 at the delivery side of the wind box, similar to dead plate 15, is also preferably provided with side flanges in horizontal register with the corresponding ledges 13, upon which flanges the adjacent ends of the sealing means or ropes 14 will rest and beyond which, toward the delivery end of the machine, the springs 17 or weights 19 will be located. The receptacles or pallets slide over the dead plates in a well known manner and by having the sealing means extend between the dead plates and along the ledges 13 contiguous thereto the sealing means resists the entrance of air into the wind box or boxes as the receptacles or pallets slide from the dead plate 15 over the adjacent wind box and from the wind box over the dead plate 22.

In accordance with my improvements as the pallets travel over the wind box or boxes the side surfaces 2ª of the pallets will be in contact with the sealing means or ropes 14 resting upon the ledges 13, and such sealing means or ropes present resistance to the flow of air into the wind box, thereby effecting a saving in the cost of operating the machine and increasing its efficiency.

Having now described my invention what I claim is:

1. In an ore treating machine the combination of a wind box, movable receptacles, means to support said receptacles for travel along the wind box, inherently flexible and pliable sealing means adapted to engage the receptacles, and supporting means along the wind box for said sealing means, said sealing means lying loosely upon said supporting means for engagement with the receptacles.

2. In an ore treating machine the combination of a wind box, movable receptacles, means to support said receptacles for travel along the wind box, inherently flexible and pliable sealing means adapted to engage the receptacles, ledges supported on opposite sides of the wind box adjacent to the receptacles, flexible sealing means resting loosely upon said ledges in engagement with the adjacent portions of the receptacles, and means to retain the end portions of said sealing means.

3. In an ore treating machine the combination of a wind box, movable receptacles, means to support said receptacles for travel along the wind box, inherently flexible and pliable sealing means adapted to engage the receptacles and the wind box, supporting means for the sealing means on opposite sides of the wind box adjacent to the receptacles, and means to retain the end portions of said sealing means.

4. In an ore treating machine the combination of a wind box, movable receptacles, means to support said receptacles for travel along the wind box, inherently flexible and pliable sealing means adapted to engage the receptacles, ledges supported on opposite sides of the wind box adjacent to the receptacles, the flexible sealing means resting loosely upon the ledges in engagement with the adjacent portions of the receptacles and wind box, a dead plate adjacent to the wind box, means to secure the sealing means to said dead plate, and means to retain the opposite ends of the sealing means.

5. In an ore treating machine the combination of a wind box, movable receptacles, means to support said receptacles for travel along the wind box, inherently flexible and pliable sealing means adapted to engage the receptacles, ledges supported on opposite sides of the wind box adjacent to the receptacles, the flexible sealing means resting loosely upon said ledges in engagement with the adjacent portions of the receptacles and wind box, a dead plate adjacent to the wind box and provided with flanges at opposite sides, means to secure the adjacent ends of the sealing means to said flanges, and means to retain the opposite ends of the sealing means.

6. In an ore treating machine the combination of a wind box, movable receptacles, means to support said receptacles for travel along the wind box, inherently flexible and pliable sealing means adapted to engage the receptacles and wind box, means to retain the sealing means at one end, and means to maintain the sealing means in a stretched condition.

7. In an ore treating machine the combination of a wind box, movable receptacles, means to support said receptacles for travel along the wind box, inherently flexible and pliable sealing means adapted to engage the receptacles and wind box, means to retain the sealing means at one end, springs connecting the opposite ends of the sealing means to maintain the sealing means in stretched condition, and supporting means for said springs.

RICHARD LEWIS LLOYD.